United States Patent [19]

DeMello et al.

[11] Patent Number: 5,607,629

[45] Date of Patent: Mar. 4, 1997

[54] PROCESS FOR EXTRUDING LOW DENSITY FOAM USING WATER AS A BLOWING AGENT

[75] Inventors: Alan J. DeMello, Newmarket; Douglas W. Hartford, Sandown, both of N.H.; Peter E. Mertinooke, Amesbury, Mass.; Dan C. Muessel, Danvers, Mass.; Louis Halberstadt, Andover, Mass.

[73] Assignee: Amesbury Group Inc., Amesbury, Mass.

[21] Appl. No.: 255,118

[22] Filed: Jun. 7, 1994

Related U.S. Application Data

[63] Continuation of Ser. No. 11,076, Jan. 29, 1993, which is a continuation of Ser. No. 689,635, Apr. 23, 1991, abandoned.

[51] Int. Cl.$^6$ .................................................. B29C 44/20
[52] U.S. Cl. .............................. 264/45.9; 264/51; 264/53
[58] Field of Search ................................ 264/41, 45.9, 51, 264/53

[56] References Cited

U.S. PATENT DOCUMENTS

| | | | |
|---|---|---|---|
| 2,386,995 | 10/1945 | Wigal | 521/82 |
| 2,797,443 | 7/1957 | Carlson | 264/53 |
| 2,911,382 | 11/1959 | Barkhuff et al. | 521/79 |
| 3,309,439 | 3/1967 | Nonweiler | 264/45.7 |
| 3,824,139 | 7/1974 | Jay et al. | 156/79 |
| 3,928,521 | 12/1975 | Haren et al. | 264/53 |

(List continued on next page.)

FOREIGN PATENT DOCUMENTS

| | | |
|---|---|---|
| 0040934 | 12/1981 | European Pat. Off. . |
| 924538 | 8/1947 | France . |
| 2514691 | 10/1977 | Germany . |
| 3310751 | 9/1983 | Germany . |

OTHER PUBLICATIONS

Benning, Calvin J., "Plastic Foams: the physics and chemistry of product performance and process technology", vol. II: Structure Properties, and Applications, 1969, p. 269.

Gibson et al., "Cellular Solids, Structure & Properties", 1988, p. 4.

Levy et al., Plastics Extrusion Technology Handbook, Second Edition, Industrial Press Inc., New York, 1989, pp. 245–248.

Walker, et al., Handbook of Thermoplastic Elastomers, Second Edition, Van Nostrand Reinhold Co., New York, 1988, pp. 126 & 128.

Monsanto Technical Correspondence, Santoprene Thermoplastic Rubber, "Extrusion Foaming Technology for Santoprene Thermoplastic Rubber", May 10, 1988, pp. 2–18.

"Foaming Agents", Modern Plastics Mid–October Encyclopedia Issue, vol. 67, No. 11, 1990, pp. 184–185, 187–188, 291–292.

"Foam Extrusion Technology for TP Elastomer", Plastics Technology, Feb., 1987, p. 23.

Primary Examiner—Allan R. Kuhns
Attorney, Agent, or Firm—Testa, Hurwitz & Thibeault, LLP

[57] ABSTRACT

In a process for extruding a low density foam, a foamable thermoplastic elastomer such as a thermoplastic rubber is selected. The selected thermoplastic elastomer is then fed into a heated extruder barrel where it is compressed and melted by the action of a screw. A blowing agent consisting of water is introduced into the melted thermoplastic elastomer. The melted thermoplastic elastomer and the water are thoroughly mixed and then cooled to a uniform, predetermined temperature. The mixture is then forced through a die to form an extruded foam profile.

6 Claims, 2 Drawing Sheets

U.S. PATENT DOCUMENTS

| | | | |
|---|---|---|---|
| 3,940,467 | 2/1976 | Brachman | 264/53 |
| 4,049,760 | 9/1977 | Lozach | 264/51 |
| 4,104,207 | 8/1978 | Pelikan | 521/84.1 |
| 4,107,260 | 8/1978 | Dougherty | 264/45.9 |
| 4,124,336 | 11/1978 | Johnson | 425/4 C |
| 4,130,535 | 12/1978 | Coran et al. | 524/495 |
| 4,278,767 | 7/1981 | DiGiulio et al. | 521/88 |
| 4,311,628 | 1/1982 | Abdou-Sabet et al. | 524/447 |
| 4,312,958 | 1/1982 | DiGiulio et al. | 521/88 |
| 4,323,655 | 4/1982 | DiGiulio et al. | 521/88 |
| 4,333,898 | 6/1982 | Schmidtchen | 264/45.9 |
| 4,409,164 | 10/1983 | Brasz et al. | 264/53 |
| 4,438,223 | 3/1984 | Hunter | 264/54 |
| 4,455,272 | 6/1984 | Schubert et al. | 264/53 |
| 4,470,938 | 9/1984 | Johnson | 264/50 |
| 4,517,316 | 5/1985 | Mason | 264/53 |
| 4,559,367 | 12/1985 | Hurps et al. | 264/53 |
| 4,652,590 | 3/1987 | Hoki et al. | 264/53 |
| 4,657,715 | 4/1987 | Myers et al. | 264/45.9 |
| 4,729,807 | 3/1988 | Hede et al. | 264/45.9 |
| 4,746,477 | 5/1988 | Wecker et al. | 264/45.5 |
| 4,801,484 | 1/1989 | Yao et al. | 264/45.1 |
| 4,824,720 | 4/1989 | Malone | 264/45.1 |
| 4,861,531 | 8/1989 | Maeda | 264/50 |
| 4,898,760 | 2/1990 | Halberstadt et al. | 428/122 |
| 4,965,029 | 10/1990 | Lidy et al. | 264/45.1 |
| 5,070,111 | 12/1991 | Dumbauld | 521/82 |

PROCESS FOR EXTRUDING LOW DENSITY FOAM USING WATER AS A BLOWING AGENT

This is a continuation of application Ser. No. 08/011,076 filed on Jan. 29, 1993, which is a continuation of Ser. No. 07/689,635 filed on Apr. 23, 1991, now abandoned.

TECHNICAL FIELD

This invention generally relates to the extrusion of elastomeric thermoplastic foam and, in particular, to a method of extruding elastomeric thermoplastic foam using water or steam as a blowing agent.

BACKGROUND OF THE INVENTION

According to conventional technique, thermoplastic foam may be produced by feeding thermoplastic resin into an extruder and, through the shearing action of one or more screws, melting the resin continuously in the barrel of the extruder. In an intermediate or a mixing section, a solvent blowing agent, usually in a liquid or gaseous state, is continuously injected into the molten resin. Alternatively, a chemical blowing agent may be dispersed throughout the particulate resin in powder form before the resin is fed to the extruder as discussed in U.S. Pat. No. 4,107,260. In either case, the extruder screw is designed to mix and dissolve the blowing agent as uniformly as possible in the molten resin. Thorough, uniform mixing is essential to the production of a high quality foam. The resultant mixture must be maintained under carefully controlled temperatures and pressures within the extruder in order to prevent the premature volatilization of the blowing agent. When the molten mixture is forced through a die, the material undergoes decompression to atmospheric pressure so that the blowing agent expands within the body of material as bubbles and a foam is produced.

Recently, the use of solvent blowing agents such as chlorofluorocarbons has come under scrutiny because of a suspected detrimental effect on the atmosphere, particularly on the ozone layer. The use of such blowing agents has become increasingly regulated, and will likely be virtually eliminated in the future. Further, although other solvent blowing agents such as hydrocarbons are believed to be somewhat less deleterious to the atmosphere than chlorofluorocarbons, hydrocarbons have flammability problems and thus their use is hazardous and/or undesirable. Since solvent blowing agents are generally utilized to produce low density foams, i.e., foams having a density less than 0.5 g/cc (31.2 lbs/ft$^3$), the elimination and/or regulation of solvent blowing agents presents a significant problem to the foam industry.

Alternatives to chlorofluorocarbons and hydrocarbons include nitrogen and carbon dioxide. However, it is difficult to mix nitrogen and carbon dioxide into thermoplastic elastomers.

One particularly attractive commercially available thermoplastic rubber is Santoprene®, available from Advanced Elastomers. Santoprene is a registered trademark of Advanced Elastomers. In a Monsanto Company publication "Extrusion Foaming Technology for Santoprene Thermoplastic Rubber" (May 10, 1985), a method is described for producing extrusions of foamed Santoprene. The above-identified Monsanto publication recommends that to produce a high-density foamed Santoprene, a modified azodicarbonamide chemical foaming agent be used. Fluorocarbon-11 is recommended as a blowing agent to produce a low density foam having a density of 0.2–0.5 g/cc (12.5–31.2 lbs/ft$^3$). Commonly assigned U.S. Pat. No. 4,898,760 describes a method and apparatus for producing a soft, thermoplastic rubber foam with densities in a range of approximately 0.03–0.30 g/cc (2–19 lbs/ft$^3$). As discussed in the '760 patent, such a foam is particularly useful as a weatherstrip, for example. However, the preferred blowing agent is a chlorinated fluorocarbon, which suffers from the deficiencies noted above. Further, newly developed blowing agents are typically very expensive to develop and ultimately result in increased processing costs.

Despite extensive research and investment, a need still remains for an inexpensive, environmentally safe, non-flammable blowing agent for thermoplastic elastomers, in particular low density thermoplastic rubber foams.

SUMMARY OF THE INVENTION

Accordingly, it is an object of the present invention to provide a method of producing a soft, low density elastomeric foam having thermoplastic properties and good compression set resistance.

It is another object of the present invention to provide a method of producing a high quality foam using an environmentally safe blowing agent.

It is yet another object of the present invention to provide a method of producing a high quality foam using a blowing agent which is inexpensive, safe and easy to handle.

The above objects may be achieved by using a process in which a foamable thermoplastic elastomer such as a thermoplastic rubber is selected. The selected thermoplastic elastomer is then fed into a heated extruder barrel where it is compressed and melted by the action of a screw. A blowing agent consisting of water is introduced into the melted thermoplastic elastomer. The melted thermoplastic elastomer and the water are thoroughly mixed and then cooled to a uniform, predetermined temperature. The mixture is then forced through a die to form an extruded foam profile.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings.

DETAILED DESCRIPTION OF THE PREFERRED EMBODIMENT

The present invention is described below with reference to a thermoplastic rubber, particularly Santoprene. However, the invention is not limited in this respect and is applicable to thermoplastic elastomers. Thermoplastic elastomer, as used herein, refers to a rubbery material with the fabrication characteristics of conventional thermoplastics and the performance properties of a conventional thermoset rubber. A thermoplastic elastomer may, for example, comprise a blend of natural or synthetic rubber and thermoplastic material.

Santoprene is a thermoplastic elastomeric rubber which may be foamed to produce extruded tubing and profiles. The characteristics and properties of Santoprene are described in U.S. Pat. Nos. 4,130,535 and 4,311,628, which are incorporated herein by reference. Santoprene is a thermoplastic vulcanizate comprising a blend of olefin rubber and thermoplastic olefin resin in which the rubber is completely cured. The '535 patent describes fully cured vulcanizates of compositions comprising blends of (a) 25–75 percent by weight of thermoplastic polyolefin resin and (b) about 75–25 percent by weight of monoolefin copolymer rubber.

The first step in the process of the present invention involves the selection of a foamable thermoplastic elastomer. In a preferred embodiment, a foamable thermoplastic rubber is selected which has a suitable hardness value to permit production of a soft, low density foam for use as a weatherseal for a window or door. In this preferred embodiment, the resulting foam should preferably exhibit compressibility (i.e. load bearing) characteristics that permit the foam to deform easily under the pressures employed to close a door or window and still resist permanent deformation (compression set) when the load is removed. For Santoprene elastomers, grades of durometer readings are preferably 73 (Shore A) or lower to achieve the proper characteristics of softness and compression set resistance. Selection of comparable hardness grades for other thermoplastic elastomers can be readily determined by reference to the teachings of this invention. It is noted that the present invention is not limited to foaming thermoplastic elastomers for use as weatherseals and thus higher durometer elastomers may be utilized in accordance with the present invention.

Figure 1:
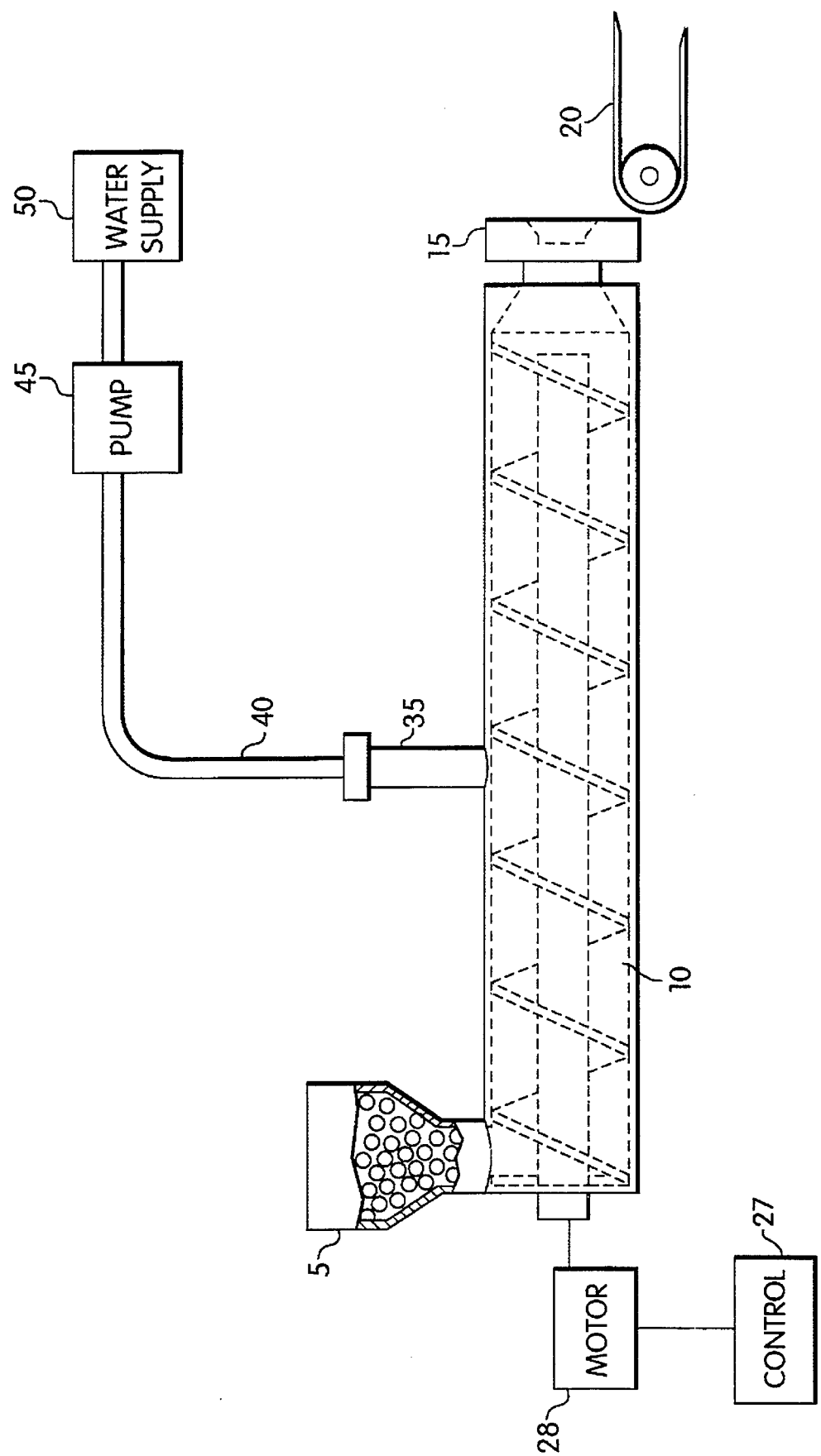
FIG. 1 is a diagram illustrating apparatus for implementing the present invention.

FIG. 1 schematically depicts an extrusion apparatus for extruding a thermoplastic elastomer. Additional details of apparatus for use in the present invention are found in U.S. Pat. No. 4,898,760, which is incorporated by reference herein. Pellets of a thermoplastic elastomer such as Santoprene are placed in a hopper 5 from where they are fed by gravity into the extruder barrel 10. Motor 28 drives the extruder and is regulated by controls 27. Cramming mechanisms known in the prior art may be used to force the pellets into the extruder barrel, although such mechanisms are not necessary. After introduction to the extruder barrel 10, the resin pellets are compressed, melted, and mixed with a blowing agent consisting of water. Water is injected into the extruder barrel at injector 35. Injector 35 is coupled via hose 40 to a pump 45. Pump 45 is coupled to a water supply 50. The molten resin having the water mixed therein is forced through a die 15. At this point, the molten mixture undergoes decompression and a foam profile is produced corresponding to the die configuration. Subsequently, the extruded profile is passed onto a conveyor 20 for cooling.

Figure 2:
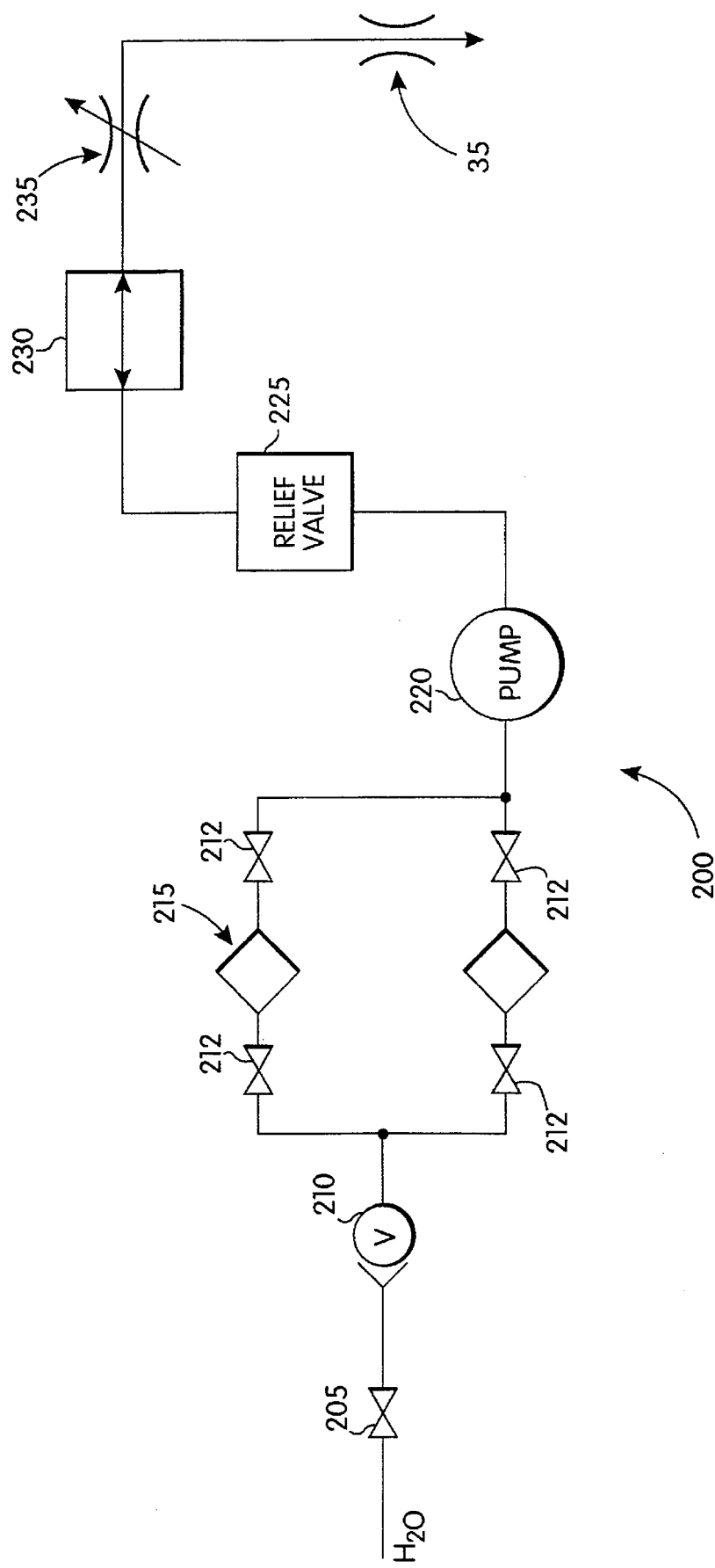
FIG. 2 shows a connection of a local water supply to an extruder.

In order to supply water to the extruder, the local water system may be directly hooked up to a pumping system 200 as shown in FIG. 2. This arrangement is desirable since it reduces the amount of material handling required to introduce the blowing agent into the extruder. ON/OFF valve 205 and check valve 210 controls the flow of water from the local water system to the pumping system 200. A double filter system 215 filters the incoming water to remove particulate contaminants which would adversely affect the pump. Valves 212 may be provided to permit the flow of water to be restricted when, for example, a filter is changed. Pump 220 controls the pumping of the water to the injector 35 of the extruder. Relief valve 225 relieves excess pressure which may be generated by pump 220. Back pressure regulator 230 ensures that sufficient back pressure is maintained for appropriate injection of water into extruder 5. This pressure must exceed the barrel pressure in order to inject the water into the barrel. Valve assembly 235 permits control of the relatively small amounts of water required for system operation. Valve assembly 235 preferably permits a range of water amounts to be supplied to injector 35. Valve assembly 235 may comprise, for example, a micrometering valve. As discussed below, since little water is needed for the foaming operation, pump 220 may provide too much water, even if set to its lowest setting. A microvalve permits metering of very small quantities of water at a constant rate. Preferably, the water is supplied to extruder barrel 10 at 500 to 3000 PSI.

Other methods of introducing water into the extruder barrel such as the use of a pressurized tank may be utilized and the present invention is not limited in this respect.

The water injected into extruder barrel 10 is exposed to high heat of the resin and the mixing action of screw 12. The heated water is dispersed inside the molten thermoplastic elastomer. When the molten material containing the high temperature water exits die 15, the pressure is reduced, the water changes to steam, and the resin expands to create foam.

Table I illustrates a temperature profile for a 2" extruder with the screw operating a 22 RPM for a particular foam shape. It should be noted that the screw speed, temperature profile, and material depend on the foam shape and density being produced. For example, the screw speed can be varied from less than 10 RPM to over 100 RPM. The temperature profile and screw speed illustrated in Table 1 is intended to be illustrative of a preferred embodiment and the invention is not limited in this respect.

TABLE I

| | 22 RPM | |
| --- | --- | --- |
| BARREL | TEMP ZONE #1 | 310° F. |
| | TEMP ZONE #2 | 340° |
| | TEMP ZONE #3 | 360° |
| | TEMP ZONE #4 | 360° |
| | TEMP ZONE #5 | 350° |
| | TEMP ZONE #6 | 345° |
| | TEMP ZONE #7 | 340° |
| | TEMP ZONE #8 | 340° |
| DIE | DIE ZONE #1 | 350° |
| | DIE ZONE #2 | 355° |
| | DIE ZONE #3 | 380° |
| | INJECTION PRESSURE - | 3000 PSI |
| | DIE PRESSURE - | 600 PSI |

It has been found that a relatively small amount of water is required to produce an acceptable high quality, low density foam. Table II illustrates the results of a test designed to measure the amount of blowing agent required to produce foam.

TABLE II

| BLOWING AGENT | QUANTITY USED |
| --- | --- |
| water | .11 lbs. per cubic foot of 10 P/cF foam |
| CFC-11 | 1.65 lbs. per cubic foot of 10 P/cF foam |

These results indicate that water has a much greater efficiency in developing cells in the thermoplastic elastomer. Thus, approximately 1500% more blowing agent by weight is required if CFC-11 is used instead of water. Stated differently, less than 7% blowing agent by weight is required when using water rather than CFC-11.

Preferably, a single screw extruder having a length to diameter (L/D) ratio of approximately 32:1 to 48:1 is used in the present invention. While thermoplastic elastomeric foam may be produced on extruders having shorter L/D ratios, the density and compression force or the foam will be higher, the surface rougher, and, in general, specific dimensions will be harder to achieve. The longer extruder permits better mixing of the blowing agent into the molten thermoplastic elastomer, faster line rates, and the ability of maintain tighter tolerances. The longer screw and barrel length allows for more mixing, better ability to cool and to control the cooling of the thermoplastic elastomer, which results in a more uniform product at low densities. In short, the longer L/D ratios permit enhanced control or fine tuning, which is important in producing complex shapes and various densities. In accordance with this invention, foams having densities as low as 0.06 g/cc (3.5 lbs/ft$^3$) have been produced.

It will be apparent that dies may be configured to produce various foam cross-sections. Dies of 0.001" to 0.300" land length have been found to work well. Generally, dies that maintain high pressures until the die opening work well with a water blowing agent.

Each of the patents identified above is incorporated herein by reference.

EXAMPLE

Santoprene having a hardness of 64 Shore A was extruded in an extruder having an L/D ratio of 48:1. The temperature profile was that set forth in Table I and the amount of water used as the blowing agent was that set forth in Table II.

While the foregoing description is directed to only presently preferred embodiments, it will be obvious to one of ordinary skill that numerous modifications may be made without departing from the true spirit of scope of the invention which is to be limited only by the appended claims.

We claim:

1. A method for extruding a thermoplastic elastomer seal comprising the steps of:

selecting a foamable thermoplastic elastomer composition comprising a blend of between 25 to 75 percent by weight of a thermoplastic polypropylene resin and, correspondingly, 75 to 25 percent by weight of fully cured monoolefin copolymer rubber;

compressing and heating the thermoplastic elastomer composition in a mixing vessel to a temperature above the melting point of the thermoplastic resin;

introducing into the heated thermoplastic elastomer composition while under pressure within the mixing vessel a blowing agent consisting of water in an amount sufficient to produce closed cell foaming of the thermoplastic elastomer composition;

mixing and heating the thermoplastic elastomer composition including melted thermoplastic resin and the water in the mixing vessel; and forcing the heated composition and water through a die opening shaped like a cross-section of a seal to form an extruded seal of substantially closed-cell foam thermoplastic elastomer substantially impervious to the passage of fluid therethrough.

2. The method according to claim 1 wherein the thermoplastic elastomer comprises a blend of natural or synthetic rubber and thermoplastic material.

3. The method according to claim 1 wherein the step of introducing water includes introducing the water in sufficient quantity relative to the thermoplastic elastomer to yield a seal having a density below approximately 0.3 grams per cubic centimeter.

4. The method according to claim 1 wherein the mixing vessel comprises an extruder and the thermoplastic elastomer is continuously extruded in the extruder, the extruder having a length-to-diameter ratio above approximately 32:1.

5. The method according to claim 1 wherein the mixing vessel comprises an extruder and the thermoplastic elastomer is continuously extruded in the extruder and further including the step of providing a direct pressure-regulated hook-up from a local water system to the extruder barrel and wherein the step of introducing water employs water from the direct hook-up.

6. The method according to claim 5 wherein the step of providing a direct hook-up further includes filtering the water with a double filter system comprising two valves, and wherein the method further includes the step of closing one of the valves and the step of changing one of the filters of the system.

* * * * *